United States Patent
Franji

(10) Patent No.: US 8,619,194 B1
(45) Date of Patent: Dec. 31, 2013

(54) PRIVACY IN TELEVISION TRACKING

(75) Inventor: Tal Franji, Hod HaSharon (IL)

(73) Assignee: Google Inc., Mountain View, CA (US)

( * ) Notice: Subject to any disclaimer, the term of this patent is extended or adjusted under 35 U.S.C. 154(b) by 189 days.

(21) Appl. No.: 13/111,778

(22) Filed: May 19, 2011

Related U.S. Application Data

(60) Provisional application No. 61/346,396, filed on May 19, 2010.

(51) Int. Cl.
*H04N 5/44* (2011.01)

(52) U.S. Cl.
USPC ........... 348/553; 348/552; 348/734; 348/715; 348/719; 709/219

(58) Field of Classification Search
USPC .......... 348/553, 552, 715, 719, 734; 709/220, 709/217, 218, 219
See application file for complete search history.

(56) References Cited

U.S. PATENT DOCUMENTS 8,082,332 B2 * 12/2011 Gilbert ......................... 709/220

* cited by examiner

*Primary Examiner* — Jefferey Harold
*Assistant Examiner* — Jean W Desir
(74) *Attorney, Agent, or Firm* — Fish & Richardson P.C.

(57) ABSTRACT

A television system for providing identification of user television viewing activities, while maintaining the privacy of individual viewers. In selected embodiments, the television system includes a random, unique identification generator that, on a periodic basis, can be used to send targeted advertisements or programming to a user. The user can force the system to re-generate a random identifier and/or purge any tracked data at any time.

20 Claims, 4 Drawing Sheets

PRIVACY IN TELEVISION TRACKING

CROSS-REFERENCE TO RELATED APPLICATION

This application claims priority to U.S. Provisional Application Ser. No. 61/346,396, filed on May 19, 2010, entitled "Privacy in Television Tracking," the entire contents of which are hereby incorporated by reference.

TECHNICAL FIELD

This disclosure relates to privacy in media systems.

BACKGROUND

Targeted advertising is growing in popularity because it works.

Targeted advertising general involves an attempt to infer a characteristic of a potential consumer of an advertisement, followed by selection of an advertisement that addresses that characteristic. For example, search engine services such as the GOOGLE search engine service match ad-associated keywords with search terms entered by a user in selected ads to display to the user, under the assumption that the user is currently interested in items for which he or she is searching, and would thus be particularly receptive to an ad on the same topic. Such advertising selection can improve experiences for users in that they receive information that is deemed to be particularly useful to them.

Television advertising has generally been much less targeted. Rather, advertisers may have been able to access general demographic information about an audience for a program, the broadcast nature of television (and radio) has prevented more precise targeting (apart from selecting certain local markets in which to run ads). However, with the development of IPTV and other similar technologies, better targeting of commercials and other forms of television advertisements has become possible. In particular, on-line activity by a user may be analyzed, and commercials may be selected for broadcast to the particular user that match inferences about the user's wants and needs.

Such analysis of user actions may raise privacy concerns for some users, despite the fact that it is directed simply at providing them with more useful information that may benefit them greatly. That is because effective determinations of user wishes generally requires determinations over a period of time.

SUMMARY

A television system may, in certain embodiments, provide identification of user television viewing activities, while maintaining the privacy of individual viewers. In selected embodiments, the television system comprises a random, unique identification generator that, on a periodic basis, can be used to send targeted advertisements or programming to a user. The user can force the system to re-generate a random identifier and/or purge any data, such as user-directed data, at any time.

In one implementation, a computer-implemented method for associating a remote device with media consumption activity is provided. The method includes storing an identifier on a television receiver device, submitting by the receiver device the identifier and information about programming viewed on the television, and selecting a replacement identifier upon receipt of a user selection of a reset control associated with the receiver device.

The method can include one or more additional elements, for example: the method may further include generating a replacement identifier periodically to block tracking of use of the device; the method may further include storing the identifier and the replacement identifier together on the device until a second replacement identifier is generated. The method may include repeatedly maintaining a determined number of most recent identifiers stored on the device. The method can include generating a storage structure reflecting aggregated viewing behavior, and submitting the storage structure to a central server system; the method may further include generating the identifier substantially randomly at the receiver device. In all implementations of the method, the identifier can be an HTTP cookie. The method can further include automatically eliminating connections between an identifier and store data that is greater than a determined age. The method can further include matching a received identifier with a stored area, and appending viewing information received with the identifier to the storage structure.

In another implementation, a computer-implemented system of identifying media consumption activity is provided. The system includes memory storing a first identifier for a television receiver device, memory storing information reflecting media programming viewed using the television receiver device, and an identifier reset control that, when selected by a user, causes a signal to be sent to a central server to remove any usable connection between the identifier and the receiver device.

The system can include one or more additional elements, for example, the system can further include an identifier selector that produces a replacement identifier when the reset control is select. Selection of the reset control can cause the replacement identifier to be stored in place of the first identifier. The system can further include an interface to report the information reflecting media programming to a central server along with the identifier. The system can further include an identifier selector that causes a replacement identifier to be stored in the memory in place of the first identifier upon selection of the reset control, to isolate reporting by the receiver device before the selection from reporting after the selection.

In yet another implementation, a computer implemented method of identifying media consumption activity is provided. The method includes maintaining a storage of viewing events for a remote device associated with a first identifier, receiving from the remote device the first identifier and a second identifier, eliminating any connections between the storage structure of viewing events and the first identifier, and maintaining a storage structure of viewing events for the remote device associated with the second identifier.

The computer-implemented method can include one or more additional elements, for example, the method can further include receiving a new identifier from the device periodically and eliminating a connection between stored activity and an existing identifier upon receiving the new identifier. The storage structure of viewing events comprises information identifying media programs that were played using the device. Further, the method can include analyzing the storage structure of viewing events group viewing behavior after eliminating the connections between the storage structure and the first identifier.

In yet another implementation, a computer-implemented system of identifying media consumption activity is provided. The system can include memory storing an first identifier for a television receiver device, a reset control associated with the receiver device, and means for anonymizing media viewing data from the device in response to selection of the reset control.

The details of one or more embodiments are set forth in the accompanying drawings and the description below. Other features, objects, and advantages will be apparent from the description and drawings, and from the claims.

DETAILED DESCRIPTION

It can be beneficial to provide systems capable of identifying a television viewer's activities and habits so that broadcasting companies can serve entertainment or advertisements customized for a particular viewer or group of viewers. For example, if a viewer watches many programs about automobile repair, it may be beneficial to a programmer, advertisers, and the user to show the user commercials for auto repair products. Making a connection between a viewer's earlier viewing history, and the current viewing of programming (so that the system may determine that the viewer who watched the prior programs is the viewer currently viewing new programming) generally requires determining the identity of the viewer in some direct or indirect manner. For example, an identifier such as an ID number can be associated with a receiver that the user employs to obtain programming, and the identifier may be reported periodically to a central service that manages delivery of promotional material to the receiver.

A user of a device may at times want the security of removing or minimizing such activities. For example, perhaps the car buff discussed above went on a stint of watching soap operas and romantic movies and wants to have any connection with such programming habits erased. The discussion below discloses various mechanisms by which such a user may choose to reset an identifier associated with their receiver so as to disconnect identifications of earlier viewing habits from identifications of later viewing habits.

Figure 1:
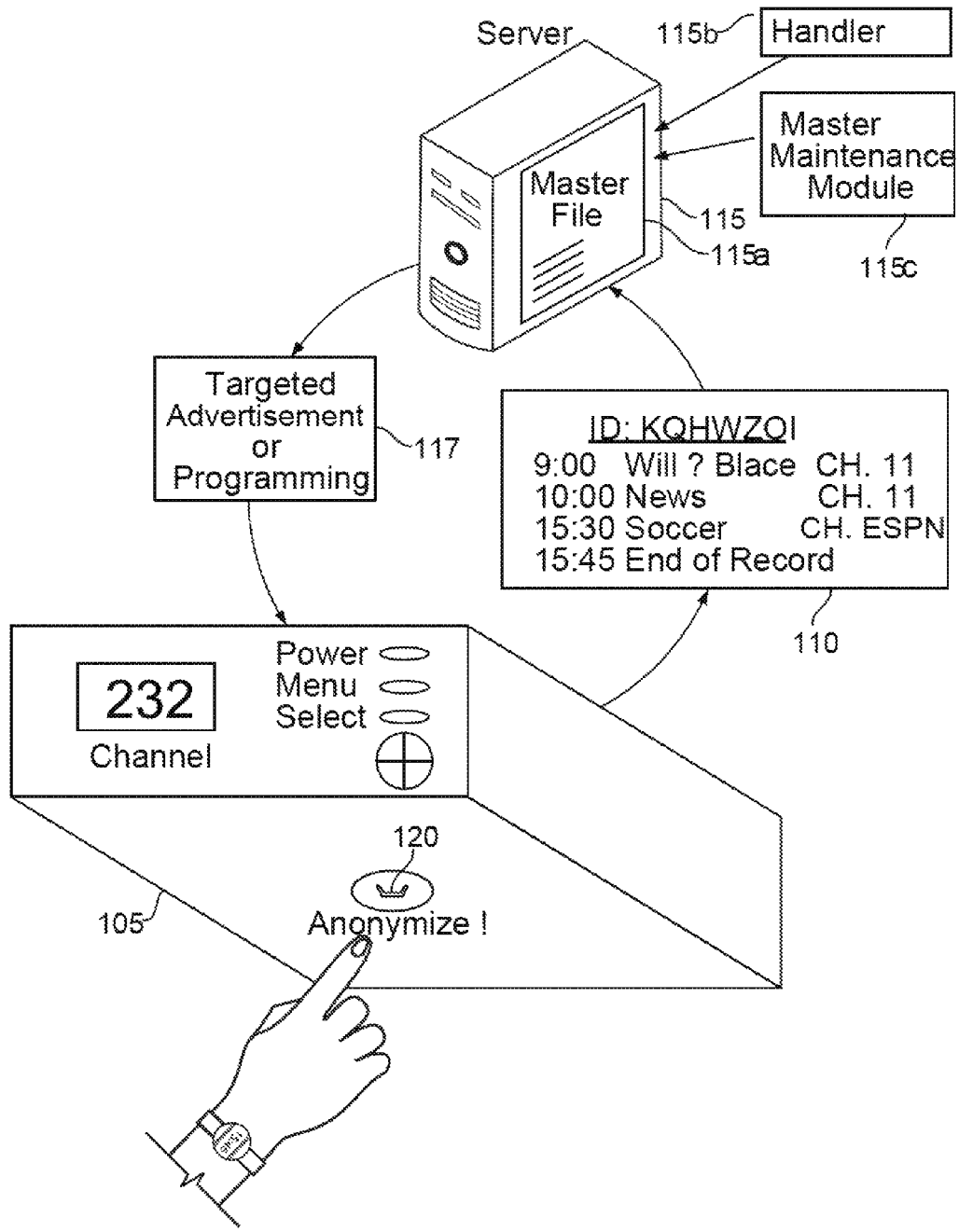
FIG. 1 is an exemplary system 100 for anonymously identifying and storing a user's television viewing habits and a mechanism for deleting any stored information, according to one general embodiment.

FIG. 1 is an exemplary system 100 for anonymously identifying and storing a user's television viewing activities and a mechanism for deleting saved information and/or identifiers that could be traced back to the viewer or the viewer's system. In general, a system 100 for identifying the viewing activities of users can include a receiver 105. In one embodiment, the receiver 105 can record the activities of viewers as they enjoy television programming, and can store the actions internally in a storage structure 110. In one embodiment, the storage structure can be stored on a computer-readable medium such as a hard-disk drive or in memory. The storage structure 110 can contain information such as the time the user turns a television set on and off, the channels watched, the time periods the channels were broadcast to viewers, identifiers (e.g., standard ID numbers) for programs watched using the receiver 105, and other related information. The storage structure 110 can also include a unique identification (ID) code that anonymously identifies the receiver 105, as described in several embodiments below.

In one embodiment, the store information includes start and stop times and program or channel IDs (where the channel IDs can be associated with a particular programming head end where standard broadcast television is identified). From such information, and from other information available to a system, various determinations may be made. For example, a title of a viewed program may be obtained, as may keywords associated with the program, such as terms that described a target demographic of the program. In addition, the portions of the program or commercials during the program that a viewer watched may also be determined, so that a system can determine whether the viewer skipped over commercial breaks, and what sort of programming caused the viewer to change channels away from the program. Other similar determinations may b made using the internal data provided by the receiver 105, and external data obtained from other sources such as third-party commercial television programming information aggregators.

In one embodiment, receiver 105 can upload a storage structure 110 to a remotely-located computer server 115 for storage and analysis. In general, server 115 can be made up of many computing systems, such as those used by data-mining companies such as Google. An exemplary computer server 115 is described with respect to FIG. 4 below. The transfer of stored information from the receiver 105 to the server 115 can take place by any appropriate mode that can transmit digital information, such as through a network of computers (e.g., the internet) or via a broadcast provider's internal communications system.

In general, server 115 can include a data handler module 115b, which can be a computer program or part of a program executable to receive stored information transmitted by a remote client system such as receiver 105. The data handler module 115b can establish communication links between the server 115 and the remote client system, parse the contents of the store data, and perform operations necessary to pass the stored information to other modules present in the server 115.

In one general aspect, the server 115 includes a master data maintenance module 115c that can perform tasks related to appending master stored files 115a on the server with the information contained in the storage structures 110 transmitted by a remote client system (e.g., the receiver 105) at periodic or other time intervals. The master storage maintenance module 115c, when executed, can seek out the appropriate master storage structure 115a file that the stored information is to be appended to, as described more completely below. The passing of store information can be initiated by the receiver 105 or by the server 115.

A master storage structure 115a can include historical details of individually-sent data that have been concatenated over time. The master storage structure 115a can effectively represent a collection of the viewer's interests and disinterests, the shows they consistently watch, and can reflect the demographic of the viewer by virtue of the programming they enjoy.

In one general aspect, the receiver 105 can generate a unique code that identifies the receiver 105, and this code can be included with the storage structure 110 transmitted to the server 115. Such a code may be anonymous as to the user, in that it can be provided in a manner that cannot be connected to a user account associated with a system that runs the server 115. In such a situation, characteristics of the user can simply be inferred from the viewing habits of whoever was previously watching programming on the receiver 105 during times in which the particular code, or receiver identifier, was in use.

In one embodiment, the receiver 105 can distinguish each user of a television or other media device by methods disclosed in co-pending U.S. provisional application No. 61/346,343, which is herein incorporated by reference in its entirety. In one embodiment, the codes generated consist of random or semi-random alpha, numeric, or alpha-numeric characters of suitable length (as shown in FIG. 1) to provide reasonable assurance of distinctness, and do not contain information that can identify a particular user (e.g., the code would preferably not be of the form: "Sally_Smith:401_Riverside_Ln". Rather, when each viewer in a household identifies themselves to the system, the system may set a pointer to save stored information to memory in a manner that associates the information with an identifier previously linked to that person. The information that would identify the particular person, such as biometric information, may be stored only on the receiver or a remote control, and may be prevented from being transmitted away from the client system in any manner. As a result, in such a situation, the server 115 would simply reporting of various identifiers that it can link to previously-reported identifiers (and by extension, to viewing information for such identifiers), and can respond with information relevant to the most recently received identifier for a system, so as to further maintain anonymity of the viewers.

In general, the unique code for each viewer and/or for the receiver 105 can be generated at regular or random intervals, e.g., once a month, every other Wednesday, every day, randomly, etc. In general, when a new unique code is created, a new storage structure can be created at the same time and the information appended to the storage structure can be correlated with the new unique code. In one embodiment, when a new storage structure is created, the old storage structure (i.e., the storage structure that was in use up until that time) can be uploaded to the server 115 and subsequently deleted from the receiver 105 entirely.

Connections between initial and subsequent codes or identifiers may be maintained or not maintained by the system. In the former situation, a table may be kept that associates various identifiers that have been assigned to a particular device. Such a table may be used to identify viewing over a longer period of time, and thus to more accurately target advertising or otherwise discern better information about consumer preferences and the like. To better address potential concerns about privacy in such a situation, the "connector" information may be stored separately from server 115 and may be made available only to applications that meet certain requirements. For example, such applications may be required to have a high level of security clearance, to assure that they are being operated by individuals who are trusted and secure.

In addition, the server storing such connections, or a related server, may be required to first receive information from such connected queries so that it may modify the data in a manner that better anonymizes it, such as by first transforming information from particular devices into aggregated information across various groups. As one example, the system might return data indicating that viewers who watched a particular set of programs during a certain period were also highly likely to watch another program—without indicating any information about individual viewing histories.

The server 115 can require a first code or identifier that identifies or otherwise corresponds to an address of the receiver 105 so that the server can send targeted advertisements and/or programming to the viewer. The targeted advertisements and/or programming can be selected according to the behaviors and/or preferences of the viewer which can be reflected in the storage data files generated by the receiver 105. For this purpose, a first random code can be generated and correlated or linked to a particular receiver 105.

In one general aspect, the receiver 105 can include a memory purge mechanism (MPM) 120 such as the button shown in FIG. 1. The MPM 120 can be located anywhere on the receiver, and in this example is on the bottom of the receiver 105 so as to prevent accidental activation. The MPM 120 can be a mechanism that, when activated, such as by pressing the button, removes all storage structure 110 and unique ID information from the receiver 105. The MPM 120 can also simply replace the existing identifier or code with a new identifier or code, so that future reporting of stored information is accompanied by the new identifier or code, and is not connectable by the server 115 to the previously-reported stored information. Alternatively, the previous code may be stored and reported along with the new code—though replaced in position by the new code—so that the server 115 or another server may note a connection between the codes, but may do so in a secure manner that interferes with attempts to illicitly make such a connection. In other words, by using separate identifiers or codes, but provide a link between the codes, the system 100 can separate the linking information, which may not need to be accessed as often, from the main stored information and thus make such information more secure.

HTTP cookies can be used in creating or supplying identifiers or unique ID codes. In this embodiment the unique ID can be set by the server when it recognizes a client with an "empty" ID—i.e., a receiver that has not been assigned a unique ID. The receiver can send the ID given to it by the server on each subsequent request and/or storage structure upload. A user can clear the unique ID using the MPM 120 as set forth previously; in this case the MPM 120 can be used to "clear" the ID set by the server and make it "empty" again.

The storage structure 110 and unique ID are stored in persistent memory on the receiver 105. When the MPM 120 is activated, the memory is cleared so that the entire contents of any identified information is permanently erased. Likewise, any information relating to the unique ID's generated on the receiver 105 is similarly erased permanently. In one embodiment, activating the MPM 120 erases all current storage structure and unique ID information and subsequently creates a new, empty storage structure and generates a new unique ID for the user. In one embodiment, the activation of the MPM 120 can erase the entire storage structure and unique ID history of the user and also send an instruction to the server 115 to permanently delete all storage structure (including master storage structures) and unique ID information for that particular user or any information that originated from the user's receiver 105.

When the MPM 120 is activated, a new code or identifier is generated (e.g., either internally by receiver 105 or by requesting a new code from server 115) and stored, and a pointer is redirected from the prior code to the new code to indicate that the new code is active. The prior code may be deleted immediately, after a first reporting of information to server 115 (so that a link may be made between the prior code and the new, replacement code), or only after a longer period of time (e.g., when yet another replacement code is generated and the first replacement code pushes the original code out of the way).

The activation of the MPM 120 can cause the receiver to send the contents of the current storage structure 110 stored within the receiver 105 to the server 115 and generate a new unique ID and storage structure file for the user. This embodiment provides the ability to retain stored information on the server, but erases all stored information from within the receiver 105.

The server 115 can keep the information from all storage structures 110 sent to it by a receiver 105 (i.e., a master storage structure 115a); however, a chain of storage structure files containing the user's randomly generated ID codes could potentially lead back to the original code that identifies the user's physical or network address. Therefore, in one embodiment, the server can remove selected unique ID codes in a master storage structure 115a. In one embodiment, only two unique ID codes are present in a master storage structure 115a stored on a server at any given time. The first unique ID code can be from the last storage structure received by the server 115, and the second code can be a new unique ID code generated with the most recent storage structure update.

The receiver 105 can keep two unique ID codes within a persistent memory, where one unique ID code is the most recent code generated for a storage structure 110, and the other is the last code generated. In this respect, the receiver 105 can include both codes when performing a storage structure update to the server 115.

Figure 2:
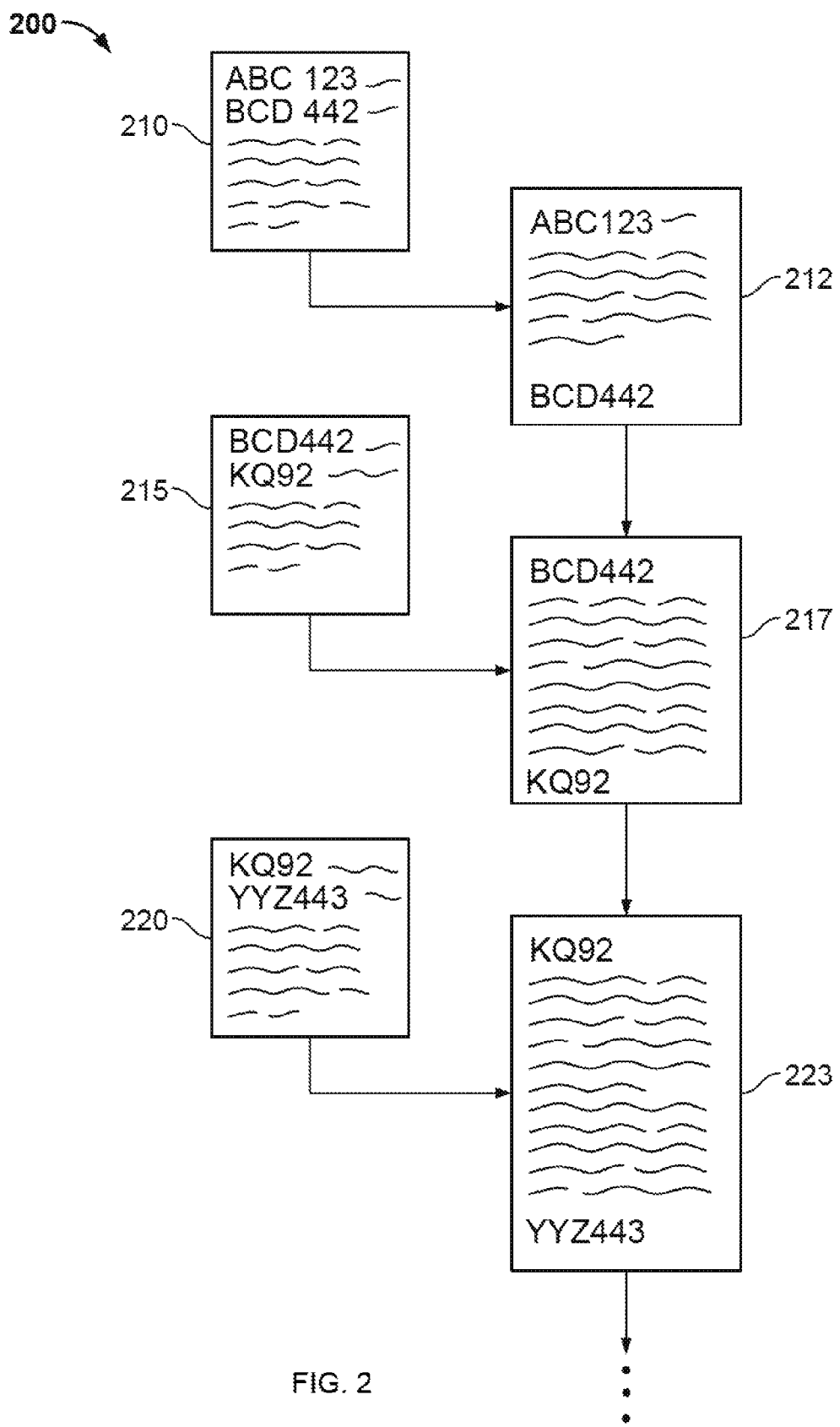
FIG. 2 is an illustration of a method for updating a master storage file, according to one embodiment.

FIG. 2 illustrates exemplary storage structure 210, 215, and 220, which are each individual storage structures, and master storage structures 212, 217, and 223, which illustrate a single master storage structure over time as the information from the storage structures are appended to it.

Exemplary stored data file 210 contains two unique ID codes generated by a receiver (e.g., receiver 105); the first is "ABC123," which may be a prior code generated by the receiver, and "BCD442," which may be the most recently-generated unique ID code. In real application, the codes would be of a form and length so as to assure that they will be reasonably unique, in that overlap of codes for different receivers will be rare enough that errors in identification of viewing will not be prohibitively frequent. The storage structure 210 also includes identification information relating to the user's television viewing. The identification information is shown in an obscured manner here, as it may take a wide variety of forms.

As the storage structure 210 is received by a server (e.g., server 115), the server can examine both unique ID codes and search the contents of the available master storage structures on the server for a match. Master storage structure 212 contains the unique ID code "ABC123," and therefore the server will append the identification information in the storage structure 210 to the master storage structure 212. In addition, the newly-generated unique ID code "BCD442" can be appended to the master file 212. As this happens, the unique ID code "ABC123" can be erased from the master storage structure file 212, and "BCD442" becomes the only unique ID in the master storage structure file 212.

A subsequent storage structure file 215, which can be produced at a later time, can be received by the server. Now, "BCD442" is the term the server attempts to match across the available master storage structure files, and "KQ92" is the new unique ID generated by the receiver. The server can match the term "BCD442" to the master storage structure file 217 and append the contents of the storage structure file 215. As illustrated previously, the new unique ID "KQ92" can be appended to the master storage structure file 217, and, subsequently, the old unique ID "BCD442" can be purged from the master storage structure file 217. This process can be iterated ad infinitum, resulting in a large master storage structure file containing history and identification information relating to the user's television viewing habits.

Each storage structure file can be accompanied by a single unique ID throughout its life. In such a situation, when a new ID code is received by a server, a storage structure file for that code may be opened. Subsequent receipt of information with the code can be appended to the storage structure, and each storage structure can be uniquely addressed by the particular code. When a code for a particular receiver changes, the server will simply start a new storage structure for that code. In certain circumstances, the server may also receive information that links the old code to the new code, and may save such linking information, such as in a manner separate from the storage structures. In this manner, certain application may be able to analyze the various storage structures individually, while other more secure applications may be given access, such as by receiving fully anonymous grouped data results, to information across multiple linked storage structures.

It can be desirable to send targeted advertising or selected programming to a viewer. In one embodiment, the master storage structures described herein can provide a detailed overview regarding preferences associated with users of a receiver and accordingly, one can provide the users with programming or products that may be of interest to them. Such matching may occur by a variety of mechanisms, such as by matching meta-data for programs watched with a receiver to demographic keywords associated with certain advertisements. Generally, once a targeted programming or advertisement has been identified for a user, it becomes necessary to identify a location (i.e, a network address) to which the material is to be sent. Such an address may be found from a most-recent communication received from the particular receiver that included both a unique ID code and an IP address or other addressing information for the receiver.

Figure 3:
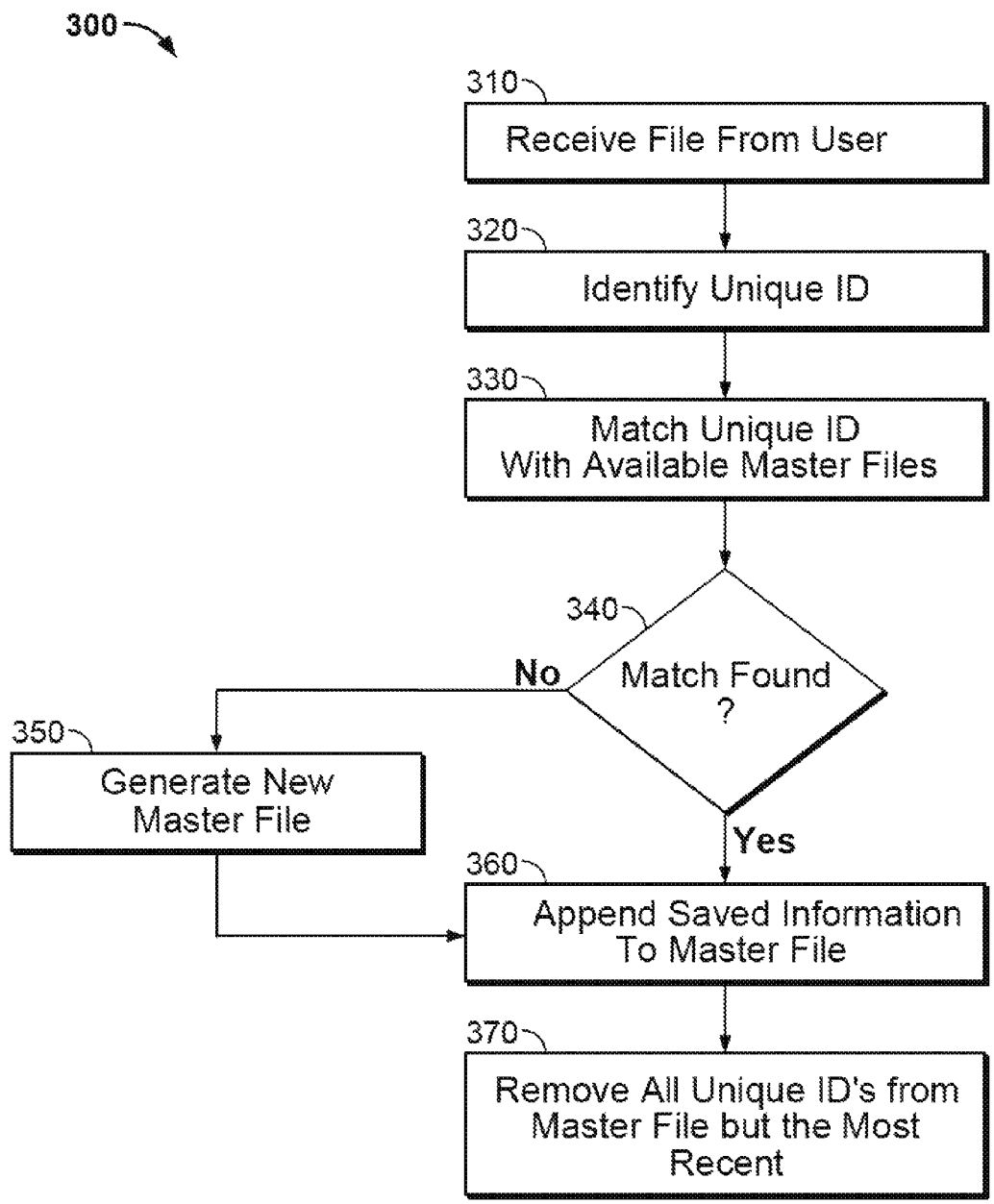
FIG. 3 is a diagram exemplifying certain server actions for creating an anonymous identification storage structure, according to one embodiment.

FIG. 3 is a diagram exemplifying certain server actions for creating an anonymous storage structure. Beginning at step 310, a storage structure file, generated by a remote receiver (e.g., receiver 105) is received by the server (e.g., server 115). In one embodiment, the storage structure file is received by a handler module as previously explained. The handler module can extract data from the storage structure file including identifying the unique ID generated by the receiver, step 320.

At step 330, a search is performed across one or more master storage structure files, which, in some embodiments, resides on the server, for a matching unique ID. In some embodiments, the unique ID can be stored in a master storage structure file with a specific identifier, such as a header, e.g., "UNIQUE ID: XXXXX" to reduce the search burden on the server. In other embodiments, the unique ID can be encrypted in either the incoming storage structure file, the master storage structure file, or both.

If a match is not found, decision 340, then the server can create a new master storage structure file, step 350. In some embodiments, such as for a new user, or in situations where a user has purged all such information from the receiver by, for example, activating an MPM, an incoming storage structure file can contain two unique ID's and no stored information relating to television identification. The purpose of such an "empty" storage structure file can be to set up a master storage structure file with two unique ID's that allow the anonymous identification system to maintain information as previously described. Alternatively, a single new storage structure file may be established with the single new ID code, and the prior storage structure file may be stored for later access but may no longer have viewing information added to it.

If a match is found (decision 340), the information relating to the user's television viewing can be appended to the master storage structure file, step 360, by, for example, a master storage structure file maintenance module 115c described in FIG. 1. In some embodiments, the information can be added verbatim, and in other embodiments, the information can be parsed and/or translated into groups containing similar or related information. For example, a master storage structure file may contain different sections corresponding to the user's preferences for certain commercials, or commercial types, certain products, programming, or other categorical preferences. In a related way, a user's distaste for certain commercials, commercial types, certain products, programming, etc. can be categorized and saved in the master storage structure file.

In addition, separate files may store detailed viewing stored information, and more generalized preference information. In particular, analysis modules may periodically review storage structures and may summarize the information in the storage structures to create profiles of the behavior displayed in the storage structures. For example, if a storage structure file shows many viewings of news programs, a profile may reflect "news" as a keyword, or may reflect some keyword that experience has associated to correspond to people who watch a lot of news.

Step 370 provides that the server can remove all unique ID information from the master storage structure file except the most recently-generated ID by the receiver, as illustrated and described with respect to FIG. 2. For example, if an indication of a re-set signal is received from a receiver or in other circumstances, various identifiers may be removed or unlinked from each other.

For example, a receiver may periodically generate a new unique ID code and may subsequently send that ID code with its storage structure file reporting. A related server may save linking information between the various periodically generated codes so as to permit analysis of viewing over a multi-code time period (though the links may be stored as described above to provide greater security). However, when a re-set signal is received such as by a user selecting a manual reset control on their received, the links may removed from the server so that each period is distinct from any other period. In addition, prior storage structure file information may also be removed, and a new unique ID code can be employed so that only newly stored information is stored. Other similar approaches for saving, deleting, linking, and unlinking, of stored information and identifiers may also be employed.

Figure 4:
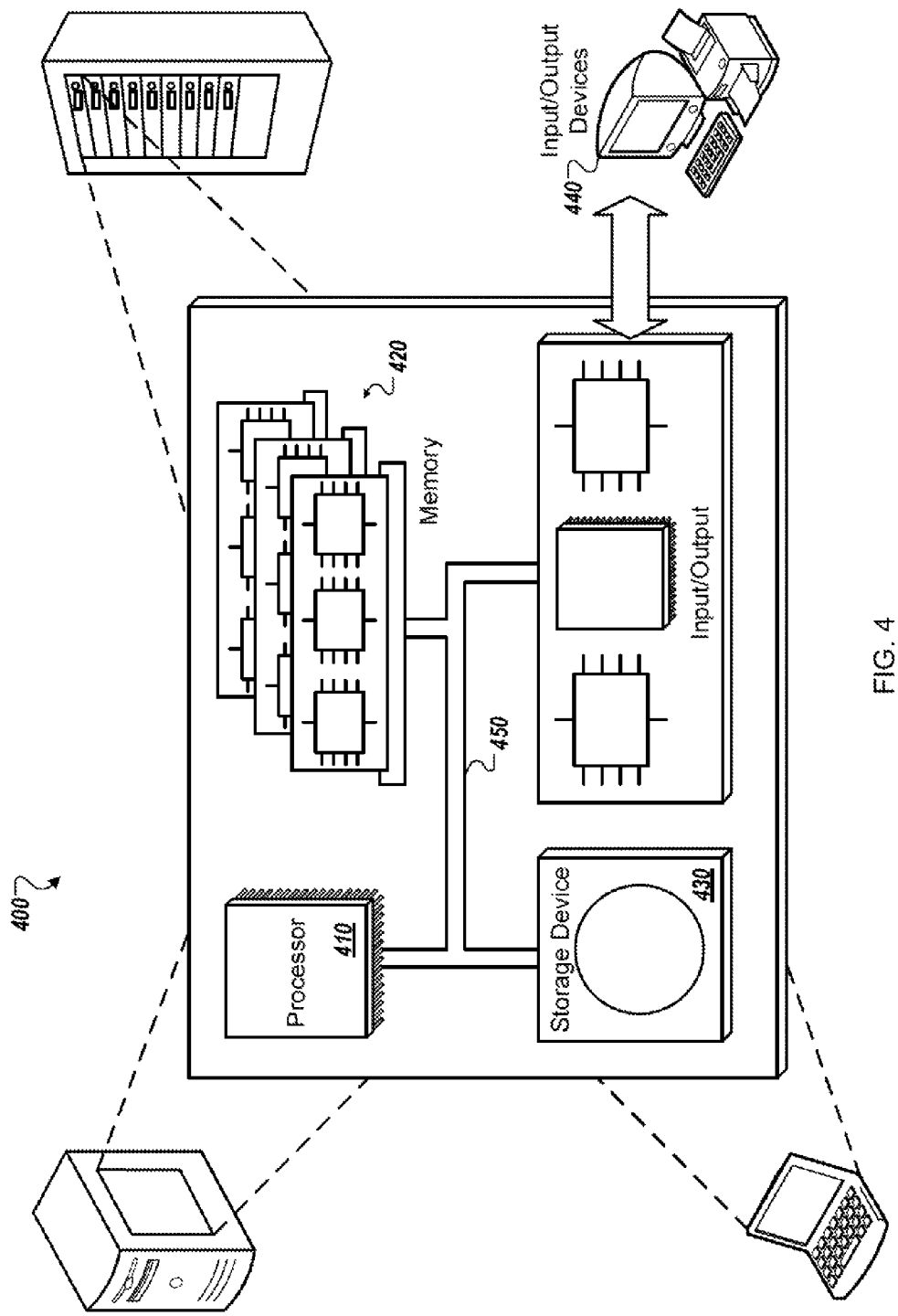
FIG. 4 is a schematic diagram of a general computing system that can be used to carry out the methods provided here, according to one general aspect.

FIG. 4 is a schematic diagram of a computer system 400. The system 400 can be used for the operations described in association with any of the computer-implemented methods described previously, according to one implementation. The system 400 is intended to include various forms of digital computers, such as laptops, desktops, workstations, personal digital assistants, servers, blade servers, mainframes, and other appropriate computers. The system 400 can also include mobile devices, such as personal digital assistants, cellular telephones, "smart phones," and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 400 can include functionality for communicating with remote devices such as those described herein; specifically, the system 400 can communicate with receivers that provide television programming such as those commonly provided by cable and satellite television service providers. In some embodiments these remote devices are those commonly referred to as "set-top-boxes" provided by cable and satellite services; in other embodiments the remote devices can be integrated into other electronic devices, such as televisions with built-in receivers, computers, "smart phones," personal data assistants (PDA's), and video phones, for example. These remote devices can include their own internal computing elements that can be the same as those described for the computer system 400. In some embodiments the remote devices have one or more of the elements described for the computer system 400.

The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. The processor may be designed using any of a number of architectures. For example, the processor 410 may be a CISC (Complex Instruction Set Computers) processor, a RISC (Reduced Instruction Set Computer) processor, or a MISC (Minimal Instruction Set Computer) processor.

In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

People should have the freedom to enjoy programming that suits their particular tastes without fear of persecution. However, social mores often times interfere with individuals' comfort to freely watch certain programming that may be construed by others as indecent or even immoral. Certain adult shows or programming that includes "alternative" political viewpoints, for example, may fall into this category. Systems that record a user's programming activities not only provide definitive evidence that a viewer received such programming, but could also be used in civil matters to establish that a person was at a certain place at a certain time. While the above-disclosed systems and methods are not provided to hide illegal activity by any means, they can provide a certain level of privacy and anonymity in programming such systems.

In general, processing, storage, memory functions, and the like, can be advantageously spread across multiple computing systems of the type described above, creating "clusters" or "grids" of thousands of computers, for example. Such advantages are known and in use by data-mining companies such as Google, for example.

A number of embodiments have been described. Nevertheless, it will be understood that various modifications may be made without departing from the spirit and scope of this disclosure. Other embodiments are within the scope of the following claims.

What is claimed is:

1. A computer-implemented method for associating a remote device with media consumption activity, the method comprising:
    storing a first identifier on a television receiver device;
    submitting to a central server system, by the television receiver device, the first identifier and information about programming viewed with the television receiver device;
    receiving an indication that a user has selected a reset control on the television receiver device;
    selecting, in response to the received indication, a second identifier to replace the first identifier, wherein selecting the second identifier comprises retiring the first identifier from further use by the television receiver device; and
    submitting to the central server system, by the television receiver device, the second identifier that replaced the first identifier so as to prevent the central server system from making any usable connection between the second identifier and information associated with the first identifier.

2. The method of claim 1, further comprising generating the second identifier to replace the first identifier periodically to block identifying use of the device.

3. The method of claim 2, further comprising storing the first identifier and the second identifier together on the device until a third identifier is generated to replace the second identifier upon receiving a subsequent indication that the user has selected the reset control on the television receiver device.

4. The method of claim 3, further comprising repeatedly maintaining a determined number of most recent identifiers stored on the device.

5. The method of claim 1, wherein the information about programming viewed with the television receiver device comprises a stored data file reflecting aggregated viewing behavior.

6. The method of claim 1, further comprising generating the second identifier substantially randomly at the receiver device.

7. The method of claim 1, wherein at least one of the first identifier and the second identifier is an HTTP cookie.

8. The computer-implemented method of claim 1, wherein the reset control comprises a button on the receiver device.

9. The computer-implemented method of claim 8, wherein the button is dedicated to providing a user with the reset control.

10. A computer-implemented system of determining media consumption activity, the system comprising:
    memory storing a first identifier for a television receiver device;
    memory storing information reflecting media programming viewed using the television receiver device; and
    an identifier reset control that, when selected by a user, causes (i) a signal to be sent to a central server to remove any usable connection between the identifier and the receiver device, and (ii) a second identifier to be generated that replaces the first identifier for the television receiver device such that the first identifier is retired from further use on the television receiver device.

11. The system of claim 10, further comprising an interface to report the information reflecting media programming to the central server along with the first identifier or the second identifier.

12. The system of claim 10, further comprising an identifier selector that causes the second identifier to be stored in the memory in place of the first identifier upon selection of the reset control, to isolate reporting by the receiver device before the selection of the reset control from reporting after the selection of the reset control.

13. The computer-implemented system of claim 10, wherein the identifier reset control comprises a button on the television receiver device.

14. A computer implemented method of determining media consumption activity, the method comprising:
maintaining a stored data file of viewing events for a remote device associated with a first identifier;
receiving from the remote device the first identifier and a second identifier; and
eliminating any connections between the stored data file of viewing events and the first identifier, and maintaining a stored data file of viewing events for the remote device associated with the second identifier,
wherein the remote device is configured to replace the second identifier with the first identifier in response to a selection of a reset control, wherein replacing the second identifier with the first identifier includes retiring the first identifier from further use by the remote device.

15. The method of claim 14, further comprising receiving a new identifier from the device periodically and eliminating a connection between stored data file activity and an existing identifier upon receiving the new identifier.

16. The method of claim 14, wherein the stored data file of viewing events comprises information identifying media programs that were played using the device.

17. The method of claim 14, further comprising analyzing the stored data file of viewing events group viewing behavior after eliminating the connections between the stored data file and the first identifier.

18. The method of claim 14, further comprising automatically eliminating connections between the first identifier or second identifier and data in the stored data file that is greater than a determined age.

19. The method of claim 14, further comprising matching a received identifier with a stored data file, and appending viewing information received with the identifier to the stored data file.

20. A computer-implemented system of determining media consumption activity, the system comprising:
memory storing a first identifier for a television receiver device;
a reset control associated with the receiver device; and
means for anonymizing media viewing data from the device in response to selection of the reset control, wherein the means for anonymizing media viewing data includes means for generating a second identifier to replace the first identifier and means for retiring the first identifier from further use by the television receiver device.

\* \* \* \* \*

UNITED STATES PATENT AND TRADEMARK OFFICE
CERTIFICATE OF CORRECTION

PATENT NO.         : 8,619,194 B1                                Page 1 of 1
APPLICATION NO.    : 13/111778
DATED              : December 31, 2013
INVENTOR(S)        : Tal Franji It is certified that error appears in the above-identified patent and that said Letters Patent is hereby corrected as shown below:

Title Page, item (54) and in the Specification, Column 1, line 1, title, delete "PRIVACY IN TELEVISION TRACKING" and insert -- ENABLING TV VIEWING HISTORY PRIVACY --, therefor.

Signed and Sealed this
Twenty-second Day of July, 2014

Michelle K. Lee
*Deputy Director of the United States Patent and Trademark Office*